United States Patent [19]
Shyu

[11] Patent Number: 5,094,086
[45] Date of Patent: Mar. 10, 1992

[54] INSTANT COOLING SYSTEM WITH REFRIGERANT STORAGE

[75] Inventor: Jia-Ming Shyu, Taipei, Taiwan

[73] Assignee: Norm Pacific Automation Corp., Hsinchu, Taiwan

[21] Appl. No.: 587,982

[22] Filed: Sep. 25, 1990

[51] Int. Cl.⁵ .............................................. F25B 41/04
[52] U.S. Cl. .......................................... 62/218; 62/509
[58] Field of Search ................... 62/509, 218; 236/75

[56] References Cited

U.S. PATENT DOCUMENTS

| | | | |
|---|---|---|---|
| 2,161,960 | 6/1939 | Hintze | 62/218 |
| 2,276,814 | 3/1942 | Zwickl | 62/509 X |
| 3,315,486 | 4/1967 | Le Chen et al. | 62/218 |
| 4,178,769 | 12/1979 | Johnsen | 62/218 X |
| 4,522,037 | 6/1985 | Ares et al. | 62/509 X |
| 4,787,213 | 11/1988 | Gras et al. | 236/75 X |

Primary Examiner—William E. Tapolcai
Attorney, Agent, or Firm—Dvorak and Traub

[57] ABSTRACT

A heat-pump type cooling system is disclosed which can provide cooling immediately before the compressor begins to rotate. The system stores liquid refrigerant condensed from compressed high pressure vapor in a liquid container, and releases it, through a control valve, to an evaporator and a temporary vapor receiver, enabling the cooling power to be controlled independently of the rotation of the compressor, in accordance with the operation of the control valve and the evaporator.

3 Claims, 2 Drawing Sheets

INSTANT COOLING SYSTEM WITH REFRIGERANT STORAGE

BACKGROUND OF THE INVENTION

This invention relates to an instant cooling system with pre-stored liquid refrigerant which can generate cooled air right after the power is on.

The basic structure of a conventional air conditioner is depicted as FIG. 2: The compressor 1 pushes high pressure high temperature refrigerant vapour 11 through the condenser 2, which is cooled by the fan 3 (hot air blows outside), and condensed to high pressure low temperature liquid 21. This liquid 21 passes through the refrigerant dryer 8 to filter out water and impurities, then through the capillary tube 9 to reduce its pressure to low pressure low temperature mist 51 and enters the evaporator 6 for expansion. The evaporator absorbs a large amount of energy (heat) from indoor air, suck in through the fan 7 (or outdoor air comes in from the fresh-air inlet V.) and makes cooled air C blow out. The low temperature low pressure vapour 61 evaporated through the evaporator 6 will be conducted into the compressor 1 again to raise its pressure and temperature. The refrigerant thus circulates repeatedly. Here, the fan 3 and the fan 7 share the same motor M. The flow of cool air C is controlled through the fan 7. The compressor 1, either working or terminating, controlled by an unshown thermostatic control unit depending on the room temperature and a preset value. The flow of refrigerant stop shortly after the compressor 1 stops. (The high pressure and the low pressure by the two ends of the capillary tube 9 becomes equivalent while flowing through the capillary tube.) Therefore, the compressor 1 must start to rotate again to rebuild pressure difference, which enables the refrigerant to condense, lower pressure and evaporate till cool air sends out again. It is unable to generate cool air instantly. The cooling effect, when liquid refrigerant enters the capillary tube for lowering pressure and expansion, will not stop when power is off and causes waste as well as unwished room temperature lowing.

SUMMARY OF THE INVENTION

This invention provides a cooling system which can generate cooling air immediately and resolves the problems mentioned above.

A system of the present invention that stores liquid refrigerant condensed from the compressed high pressure vapour in a liquid container, and release it, through a valve, to an evaporator and a temporary vapour receiver, enables the release of cooled air and the rotation of the compressor to be operated independently, accordance with the rotation of an independently controlled evaporator fan. The pre-stored liquid refrigerant can generate an adequate amount of cooled air right after the power is on.

DETAILED DESCRIPTION OF PREFERRED EMBODIMENTS

Figure 1:
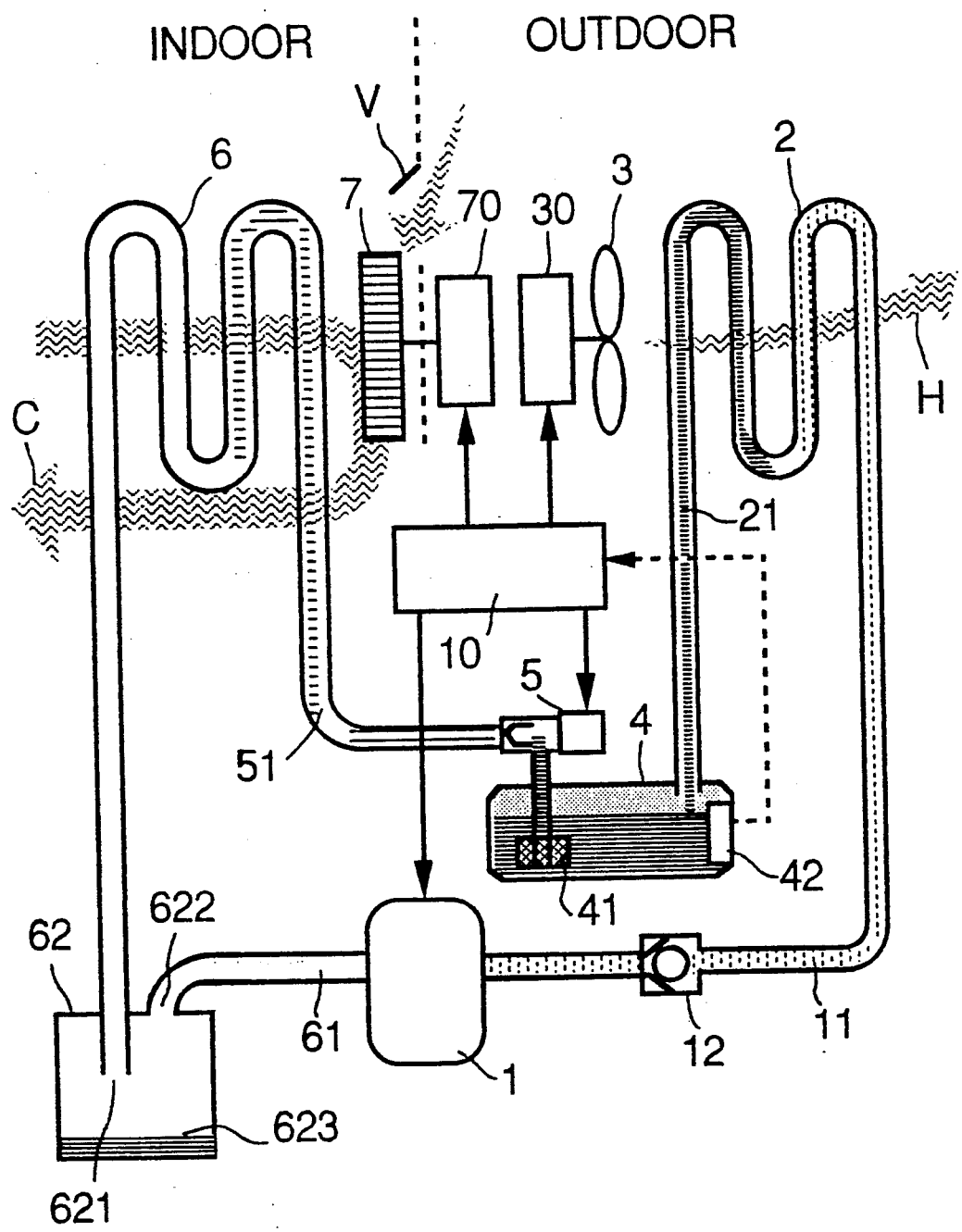
FIG. 1 shows the composition of an embodiment of the present invention.
Figure 2:
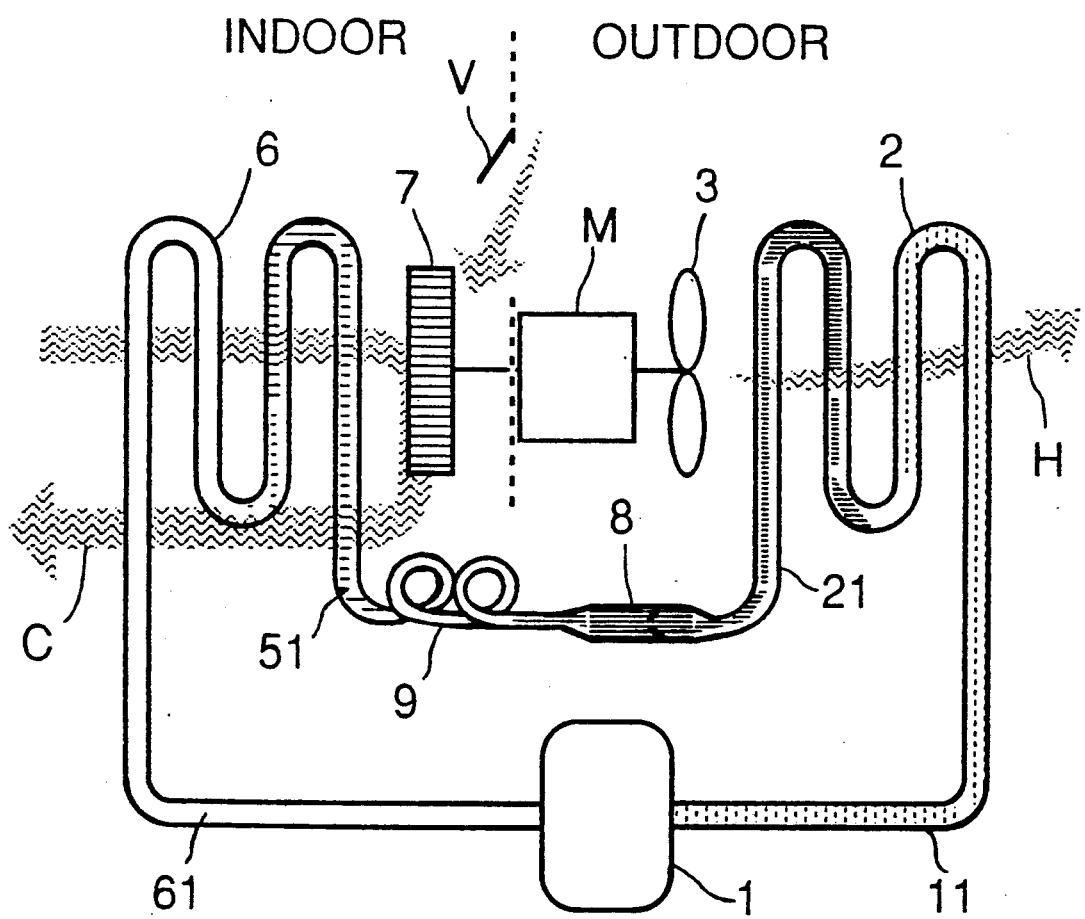
FIG. 2 shows the composition of a conventional cooling system.

As FIG. 1 is shown, an embodiment of this invention comprises the same mechanisms as those in the conventional system as shown in FIG. 2, such as, the compressor 1, the condenser 2, the fan 3, the evaporator 6, the fan 7 and the fresh-air inlet V; the refrigerant circulating in the tube as the high pressure high temperature vapour 11, the high pressure low temperature liquid 21, the low pressure low temperature mist 51 and the low pressure low temperature vapour 61; and the generated hot air H and cooling air C. The fan 3 and the fan 7 are better driven by two independently controlled motor 30 and 70. This invention, instead of directly connecting the refrigerant dryer 8 and the capillary tube 9 to the condenser 2 and the evaporator 6 as shown in FIG. 2, sets a liquid container 4 to store the condensed high pressure low temperature liquid 21, which filtered through the filter 41, controlled by a solenoid (electromagnetic) valve 5 to inject toward the evaporator 6 and becomes low pressure low temperature mist 51 and then starts to evaporate. The solenoid valve 5, either an on/off valve, or a needle valve which is able to be controlled continuously, operates under the control signal released from the controller 10. The valve 5 basically owns a valve needle drawn and withdrawn by the electromagnetic power and a spring, to open and close a nozzle. The nozzle opens to a certain degree, while the timing that controls the on/off of solenoid valve can control the injecting amount of the refrigerant 51. This kind of structure and function can be approached from the prior arts such as fuel injector. It will not be detailed described here.

The liquid container 4 includes a level sensor 42, which monitors the stored amount of liquid refrigerant 21, and sends out a signal to the controller 10 to make adjustment to maintain an adequate amount of liquid refrigerant at all times, —when the storage level drops to the low threshold, the rotation of the compressor 1 and the condenser fan motor 30 will speed up or start; when the level ascents to the high threshold, the rotation of the compressor 1 and the condenser fan motor 30 will slow down or stop. It also has the function that, when the compressor 1 is prepared to stop but the storage level is still below the high threshold, the compressor 1 and the condesnor fan motor 30 will keep rotating until the deficient is made up.

To prevent the liquid refrigerant 21 from flowing back to the compressor 1 before the compressor 1 starts to rotate, a check valve 12 is set to a proper position in the tube as shown.

The liquid container 4 stores liquid refrigerant 21 all the time, therefore, the quantity or flow rate of injecting out refrigerant 51 from the solenoid valve 5 can be adjusted any time, if necessary. That is, the on/off time of the solenoid valve 5 and the speed of evaporator fan motor 70 controlled by the controller 10 can decide the cooling capacity of the cooling air C; even when the compressor 1 lies in low rotating speed, or does not rotate. Only if the two ends of the solenoid valve 5 exist pressure difference that enables the refrigerant to inject out and get into the evaporator and the vapour receiver, it can release an adequate amount of cooling air C because of the operation of the solenoid valve 5 and the evaporator fan motor 70.

In order to accommodate an adequate amount of refrigerant 51, 61 in the low pressure tube before the compressor 1 starts to rotate or when it rotates in a slow speed, we can enlarge the diameter or the length of the evaporator 6, or set up a vapour receiver 62 after the evaporator 6 as shown. The exit 622 of the receiver 62 is higher than the entrance 621, therefore, the compressor 1 is protected from damage that any condensed liquid refrigerant or water, if by any chance, remains in the bottom 623 of the receiver 62 and is prevented from flowing into the compressor 1.

The controller 10 operates according to the input data from an unshown control panel and some certain temperature sensors. It consists of the conventional techniques of microprocessor and the control circuits. It is not the main point of this invention, therefore, will not be described further.

This invention achieves that the release of the cooling air is not influenced directly by the speed and rotation of the compressor; the output power (flow rate and temperature) of the cooling air is easy to be changed; and the effect of energy saving enhanced. Furthermore, the controlled room temperature is more accurate. These results can not only improve the house cooling system, but also be applied to a car cooling system: since the compressor of a conventional system is usually motivated by the engine of the car, and the system can not generate cooling air before the engine starts, and can not release an adequate amount of cooling air, either, when the engine remains in an idle speed. But with this invention, all these drawbacks will be removed.

The embodiment stated above are set based on an air-cooled air conditioner. However, this invention can also be applied to a water-cooled cooling system or a cool/heat combination system. Any modification without despising the spirit of this invention is included in the extent of the appended claims.

I claim:

1. An air-conditioning cooling system comprising:
   a condenser and an evaporator connected in series along a refrigerant path,
   refrigerant arranged and constructed to circulate through said refrigerant path,
   a liquid refrigerant storage container disposed between said condenser and said evaporator,
   a control value disposed between said liquid refrigerant storage container and said evaporator,
   a vapor receiver disposed between said evaporator and a compressor,
   a controller arranged and constructed to continue compressor operation, after said control valve has stopped releasing refrigerant to said evaporator, to draw refrigerant fluid from said vapor receiver, propel said fluid through said condenser and into said liquid container, whereby, after said compressor has stopped, said control valve will release refrigerant from said liquid container to said evaporator for providing a cooling effect before said compressor restarts.

2. An air-conditioning cooling system according to claim 1, further comprising a fluid level sensor associated with said liquid refrigerant storage container, said fluid level sensor arranged and constructed to sense an amount of stored refrigerant and generate signals utilized by said controller in controlling said compressor and said condenser to maintain a correct level of stored refrigerant in said liquid refrigerant storage container.

3. An air-conditioning cooling system according to claim 1, further comprising a check valve connected in series between said compressor and said condenser.

* * * * *